United States Patent [19]

Leiner et al.

[11] 4,395,528

[45] Jul. 26, 1983

[54] CATALYST COMPOSITION AND CURABLE POLYMER COMPOSITIONS CONTAINING SAME

[75] Inventors: Howard H. Leiner, Cranbury; Emily C. Bossert, Westfield, both of N.J.

[73] Assignee: M&T Chemicals Inc., Woodbridge, N.J.

[21] Appl. No.: 239,874

[22] Filed: Mar. 2, 1981

[51] Int. Cl.$^3$ .................. C08G 18/80; B01J 31/12
[52] U.S. Cl. ............................ 528/45; 252/428; 252/431 C; 252/431 R; 204/181 C; 525/124; 525/452; 525/453; 525/459; 525/528; 423/415 R
[58] Field of Search ............ 528/45; 252/428, 431 C, 252/431 R; 525/124, 452, 453, 459, 528

[56] References Cited

U.S. PATENT DOCUMENTS

| | | | |
|---|---|---|---|
| 3,178,389 | 4/1965 | Hallenbeck | 260/42.32 |
| 3,668,186 | 6/1972 | Duncan et al. | 528/45 |
| 3,673,159 | 6/1972 | Dijkhrizen et al. | 528/45 |
| 3,993,849 | 11/1976 | Victorius | 528/45 |
| 4,031,050 | 6/1977 | Jerabek | 525/528 |

FOREIGN PATENT DOCUMENTS

| | | |
|---|---|---|
| 796805 | 10/1965 | Canada . |
| 50-155585 | 12/1975 | Japan . |
| 54-163945 | 2/1979 | Japan . |
| 994348 | 6/1965 | United Kingdom . |

OTHER PUBLICATIONS

Fischer, Tetrahedron 19, Supp. 1, pp. 97–104, (1963).

*Primary Examiner*—H. S. Cockeram
*Attorney, Agent, or Firm*—S. A. Marcus; S. H. Parker; F. Schoenberg

[57] ABSTRACT

A portion of the tin compounds conventionally employed to cure polymer compositions containing hydroxyl and isocyanate groups can be replaced by salts or chelated coordination complexes of divalent copper, zinc, nickel, iron, cobalt or vanadium without any substantial decrease in cure rate or solvent resistance of the cured coating.

31 Claims, No Drawings

CATALYST COMPOSITION AND CURABLE POLYMER COMPOSITIONS CONTAINING SAME

BACKGROUND OF THE INVENTION

1. Field of the Invention

This invention relates to catalyst compositions for curing polymeric coatings. More particularly this invention relates to compositions for catalyzing the curing of polymer compositions containing hydroxyl and isocyanate groups.

The solvent resistance of organic polymer coatings can be substantially increased by "curing" or "cross-linking". During this process chemical bonds are formed between polymer molecules. One method for curing involves reacting a polymer containing pendant functional groups with a compond containing two or more groups that will react with the functional groups on the polymer.

A specific method for curing polymer compositions is to react a polymer containing pendant hydroxyl groups with a blocked polyfunctional isocyanate. Alternatively, both hydroxyl and blocked isocyanate groups can be present on the same polymer. An isocyanate group can be blocked by reacting it with an active hydrogen-containing compound such as an alcohol or phenol. When a polymer composition containing hydroxyl and blocked isocyanate groups is heated to above 100° C. the blocking reaction reverses, freeing the isocyanate groups which then react with the hydroxyl groups to form a cross-linked structure.

DESCRIPTION OF THE PRIOR ART

The use of organic and inorganic tin compounds to cure coating compositions containing hydroxyl and blocked isocyanate groups is disclosed in British Pat. No. 994,348. The preferred tin compounds include stannous octoate, stannic chloride, butyltin trichloride, dibutyltin dilaurate, di(2-ethylhexyl)tin oxide and dibutyltin dibutoxide. There is no teaching in this patent that a portion of the tin compound can be replaced with compounds that are ineffective or only marginally effective catalysts without incurring any significant loss in catalytic activity.

U.S. Pat. No. 3,178,389 teaches that carboxyl-containing polymers derived from ethylenically unsaturated monomers can be cured using as the catalyst a polyvalent metal oxide such as zinc oxide or dibutyltin oxide and an alcoholate derived from a polyvalent metal, such as zinc. There is no indication in this patent that the catalyst compositions would function as curing agents for polymers containing blocked isocyanate groups, and in fact some of the compounds disclosed, such as zinc oxide, have been shown to be ineffective for this application.

The combination of a tin compound, a zinc compound and a sterically hindered phenol as a stabilizer for polyesters derived from 1,4-butanediol is taught in Japanese Patent Publication No. 79,163,945. Japanese Patent Publication No. 75,155,585 discloses reacting a glycol and a dicarboxylic acid in the presence of dibutyltin oxide and zinc acetate. The resultant polyester is then reacted with a diisocyanate. Neither of the two foregoing Japanese patent publications teach employing the disclosed catalyst compositions for curing polymers by the reaction of blocked isocyanate and hydroxyl groups.

Canadian Pat. No. 796,805 discloses the preparation of polyurethane foams using a conventional tin-containing gel catalyst and, as the blowing catalyst, a fatty acid salt of manganese, iron, cobalt or nickel. There is no disclosure in this patent indicating that the claimed combination of catalysts can be used for the reaction between blocked isocyanate and hydroxyl groups to form a cross-linked non-cellular polymer. The blowing catalysts disclosed in this reference are not considered effective for the reaction between isocyanate groups and hydroxyl groups on organic molecules.

The use of various metal acetylacetonates, including those of copper, nickel and cobalt, as catalysts for the reaction of nitro-substituted diols with diisocyanates is taught by J. R. Fischer [Tetrahedron, 19, Supplement 1, 97-104 (1963)]. This reference does not disclose using the acetylacetonates to improve the catalytic activity of tin compounds in the isocyanate-diol reaction.

The use of blocked isocyanate groups to cure coatings formed from aqueous dispersions of certain hydroxyl-containing polymers is disclosed in U.S. Pat. No. 4,031,050. The polymers are reaction products of an epoxide-containing polymer and a primary and/or secondary amine. This patent discloses that catalysts conventionally employed for the reaction between isocyanates and hydroxyl-containing compounds to form urethane groups may be required, depending upon the reagent employed to form the blocked isocyanate.

Inorganic and organic tin compounds are among the most effective catalysts for the reaction of isocyanates with hydroxyl compounds, particularly alcohols and polyols. Tin compounds frequently employed for this purpose include stannous 2-ethyl-hexanoate (also referred to as stannous octoate), dibutyltin dilaurate, dibutyltin bis(dodecyl mercaptan) and dibutyltin oxide. While these compounds are among the most effective catalysts, they are also among the most costly, and there is a continuing search for less expensive materials that can replace at least a portion of the tin compound without any significant loss of catalytic activity.

It has now been found that up to 90% by weight of a conventional tin-containing urethane catalyst can be replaced by one or more salts or chelated coordination complexes of copper$^{II}$, zinc$^{II}$, nickel$^{II}$, iron$^{II}$, cobalt$^{II}$ or vanadium$^{II}$. The catalytic activity of the resultant composition is at least equivalent to that of an equal weight of tin compound, and the cost of the catalyst is considerably reduced.

DESCRIPTION OF THE INVENTION

This invention provides compositions for catalyzing the reaction between blocked isocyanate groups and hydroxyl groups bonded to organic molecules, the compositions comprising (1) a tin-containing urethane catalyst and (2) a metal compound selected from the group consisting of salts and chelated coordination complexes of copper$^{II}$, zinc$^{II}$, nickel$^{II}$, iron$^{II}$, cobalt$^{II}$ or vanadium$^{II}$.

This invention also provides polymer compositions that can be applied as coatings which are subsequently rendered solvent resistant by reacting blocked isocyanate groups with pendant hydroxyl groups on the polymer to form a cross-linked structure. The polymer compositions comprise (1) a polymer containing pendant hydroxyl groups and, optionally, blocked isocyanate groups, and (2) one of the present catalyst compositions.

If blocked isocyanate groups are not present on the polymer, a fully blocked polyfunctional isocyanate is included as a separate ingredient in the polymer composition. Liquid compositions optionally contain a solvent or a liquid dispersion medium for the polymer.

THE TIN COMPOUND

The tin compounds that comprise part of the present catalyst compositions are conventional catalysts for the reaction of hydroxyl-containing organic molecules with isocyanates to form urethane groups. Representative members of this class of tin compounds include stannous salts of carboxylic acids, organostannonic acids such as butylstannonic acid, organothiostannonic acids, diorganotin oxides such as dibutyltin oxide, diorganotin sulfides, mono- and diorganotin halides such as dimethyltin dichloride, mono- and diorganotin carboxylates such as dibutyltin dilaurate, dibutyltin adipate and dibutyltin maleate, mono- and diorganotin mercaptides such as dibutyltin bis(lauryl mercaptide), mono- and diorganotin derivatives of mercaptocarboxylic acid esters and mercaptoalkanol esters such as dibutyltin-S,S'-bis-(isooctyl mercaptoacetate) and dibutyltin S,S'-bis(mercaptoethyl stearate), diorganotin oxides such as dibutyltin oxide and mono- and diorganotin derivatives of $\beta$-diketones such as dibutyltin bis-acetylacetonate, and other chelating agents such as 4-hydroxycoumarin and 8-hydroxyquinoline, that contain at least one hydroxyl or carbonyl group.

In a narrower embodiment of this invention the tin compound can be represented by the formula $Sn(OOCR^1)_2$, $(R^2)_aSn(OOCR^3)_{4-a'}$, $(R^2)_aSn(SR^4)_{4-a}$, $(R^2)_aSnY_2$ or $(R^2)_2SnO$, where $R^1$ and $R^3$ are the same or different hydrocarbyl groups, $R^2$ is alkyl containing from 1 to 20 carbon atoms or cycloalkyl containing from 5 to about 8 carbon atoms, $R^4$ is selected from the same group as $R^1$. Alternatively, $R^4$ can be $-R^5COOR^6$ or $-R^7OOCR^6$ wherein $R^5$ is alkylene and contains from 1 to 20 carbon atoms, $R^6$ is selected from the same group as $R^1$, $R^7$ is alkylene and contains from 2 to 20 carbon atoms, Y represents a halogen atom or the residue remaining following removal of the active or labile hydrogen atom from a $\beta$-diketone or other $\beta$-disubstituted chelating agent and a is 1 or 2.

As herein the term "hydrocarbyl" is defined as the residue remaining following removal of a hydrogen atom from a saturated or ethylenically unsaturated hydrocarbon that can be unsubstituted or contain one or more inert substituents. The hydrocarbyl group can be alkyl containing from 1 to 20 carbon atoms, alkenyl containing from 2 to 20 carbon atoms, cycloalkyl, aryl, alkaryl or aralkyl. When the hydrocarbyl group is alkyl it contains from 1 to 20 carbon atoms and can be, for example, methyl, ethyl, n-propyl, n-butyl or the isomeric hexyl, octyl, decyl, dodecyl, hexadecyl and eicosyl groups. Any hydrocarbyl group may optionally contain one or more inert substituents that will not adversely affect the activity of the catalyst composition. Representative substituents include alkoxy, thioalkoxy, hydroxyl and carboalkoxy.

The group represented by $R^2$ is preferably alkyl, most preferably methyl, butyl or octyl. This preference is based on the fact that methyl, butyl- and octyltin compounds and the intermediates for preparing these compounds are often more readily available than other organotin compounds.

When a hydrocarbyl group is alkenyl it contains from 2 to 20 carbon atoms and can be, for example, vinyl, allyl or oleoyl. Representative cycloalkyl groups include cyclopentyl, cyclohexyl and cyclooctyl. When the hydrocarbyl group is aryl it can be phenyl, naphthyl, anthracenyl or phenanthryl. Aralkyl is represented by benzyl and $\beta$-phenylethyl and alkaryl is represented by the isomeric tolyl and xylyl groups. The alkyl portion of any aralkyl or alkaryl group contains from 1 to 20 carbon atoms.

When the catalyst compositions of this invention are employed in combination with aqueous dispersions or emulsions of film-forming polymers, such as the amine-modified epoxide polymers disclosed in the aforementioned U.S. Pat. No. 4,031,050, to achieve maximum curing rate and solvent resistance the tin compound is preferably a dialkyltin oxide or a dialkyltin bis-$\beta$-diketonate.

THE DIVALENT METAL COMPOUND

In addition to the previously disclosed tin-containing urethane catalyst the catalyst compositions of this invention also include a salt or chelated coordination complex of divalent copper, zinc, nickel, iron, cobalt or vanadium. If the degree of water solubility of the compound will not adversely affect the stability of the polymer composition, any available salt or chelated complex of the aforementioned divalent elements can be included in the catalyst composition. Representative salts are derived from inorganic acids, carboxylic acids, hydroxycarboxylic acids, alcohols, glycols and phenols.

Representative carboxylic acids include both monocarboxylic acids containing from 1 to about 20 carbon atoms, such as formic, acetic, acrylic, methacrylic, propionic, butyric, hexanoic, octanoic, decanoic, stearic, oleic, eiconsanoic and benzoic acids, and dicarboxylic acids such as oxalic, malic, maleic, succinic, sebacic and the isomeric phthalic acids. If the non-metallic portion of the salt is derived from a hydroxycarboxylic acid it preferably contains from 2 to 20 carbon atoms. Typical hydroxycarboxylic acids include hydroxyacetic and lactic acids. Representative inorganic acids include carbonic, hydrochloric, nitric, sulfuric and phosphoric acids.

The carbonates of copper, zinc, nickel, iron, cobalt and vanadium exist as the pure carbonate, $MCO_3$, or as "basic" carbonates, which are believed to be mixtures of the carbonate and the oxide or hydroxide of the metal in a single molecule. For example, the formula for basic zinc carbonate can be written as $3Zn(OH)_2.2ZnCO_3$.

Some alkoxides and phenoxides of the metallic elements present in the salts of this invention may be hydrolytically unstable. This is particularly true of alkoxides in which the hydrocarbyl group is linear and contains fewer than about 8 carbon atoms. These hydrolytically unstable compounds are useful for non-aqueous polymer compositions, including solid compositions in finely divided form that are applied as powder coatings using a fluidized bed.

It is known that one of the hydrogens on the carbon atom located between two electron-withdrawing groups such as the carbonyl groups of a $\beta$-diketone or the carbonyl and hydroxyl groups of 4-hydroxycoumarin is sufficiently labile that it can be displaced by organotin halides and salts of zinc, copper and the other divalent metals of this invention to form a chelated coordination complex. In addition to being chemically bonded to the metal atom, the $\beta$-diketone or other suitable ligand forms a chelate with the metal by means of coordinate bonds. The structure of zinc diacetylacetonate can be written as

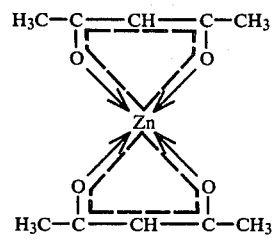

Diketones containing from 5 to 20 carbon atoms represents a preferred class of chelating agents. Most preferably the β-diketonate is an acetylacetonate, this preference being based on the availability of the corresponding diketone, which is also referred to as 2,4-pentanedione.

PREFERRED CATALYST COMPOSITIONS

All of the combinations of tin-containing urethane catalyst and divalent compounds encompassed by the present claims are effective catalysts for curing polymer compositions containing isocyanate and hydroxyl groups bonded to organic molecules. Preferably the isocyanate groups have been blocked by reaction with an alcohol, phenol or other suitable reagent. The extent to which given combinations of tin compounds and bivalent metal compound increases the cure rate of a particular polymer composition is a function of several factors, including activity of the catalyst composition, compatibility of the coating composition with the catalyst and solubility of the catalyst composition in the molten polymer. It may be difficult to predict in advance the optimum catalyst composition for a given polymer formulation, however this can readily be determined with a minimum of routine experimentation.

The relative concentrations of tin and divalent metal compounds required to achieve the desired increase in the rate and/or degree of curing of a film-forming polymer composition is a function of several parameters, including the type of polymer and the conditions under which the polymer is cured. It has been found that in some instances up to 90% by weight of the tin compound can be replaced with one of the present divalent metal compounds without adversely affecting to any significant extent the rate or degree of curing obtained under a given set of conditions. In some instances a significant increase in the cure rate can be achieved by replacing as little as 1% by weight of the tin compound. Preferably the divalent metal compound constitutes from 50 to 75%, based on the combined weight of tin compound(s) and divalent metal compound(s). It will be understood that the present catalyst compositions may contain two or more tin compounds and/or divalent metal compounds to achieve a particularly advantageous effect during curing of a given polymer compositions.

For certain applications, such as electrodeposition, a positive or negative charge is introduced onto a polymer molecule. This is readily accomplished by having carboxy or amino groups present on the polymer and subsequently reacting these groups with a base or acid as required to form a carboxylate, ($R^1COO^-$), or ammonium $-N(R^2)_4^+$ ion. In the foregoing formulae $R^1$ is a hydrocarbyl group and $R^2$ is hydrogen or a hydrocarbyl group. The stability of emulsions, dispersions or solutions of these polymers in aqueous media may be adversely affected by the presence of even catalytic amounts of ionized salts in the coating composition. In these instances, to avoid coagulating the polymer it may be necessary to employ a salt or chelated complex that is only slightly soluble in water (no more than 0.1 g. of salt or chelated complex will dissolve in 100 g. of water at ambient temperature) but soluble in catalytic amounts in the molten polymer. Divalent metal compounds that are preferred for use with these types of polymer compositions include the basic carbonates, carboxylates, hydroxycarboxylates and β-diketonates of zinc, copper, nickel and iron. Preferred carboxylates include acetates, lactates; the acetylacetonates are the preferred β-diketonates. These compounds are preferably employed in combination with a dialkyltin oxide or -bis-β-diketonate.

A catalyst composition that is particularly effective for use with amine-modified epoxide polymers such as those described in U.S. Pat. No. 4,031,050 is prepared by reacting a diorganotin salt of a mineral or carboxylic acid, such as dibutyltin dichloride, and a zinc salt of a mineral or carboxylic acid, such as zinc chloride, with at least a stoichiometric amount of an alkali metal carbonate or bicarbonate, based on the amount required to react with both the zinc and organotin compounds. In accordance with a preferred method dibutyltin dichloride and zinc chloride are added concurrently or sequentially to an aqueous solution of sodium carbonate or bicarbonate. The chlorides can be added as solutions or dispersions in water that optionally contains a surfactant or a water-miscible solvent such as methanol can be used if the diorganotin dihalide is substantially insoluble in water. Alternatively, the diorganotin dihalide can be added in molten form.

Electron photomicrographs of a dried precipitate obtained using the foregoing preferred method indicate that the particles are considerably more uniform in size than the particles in a physical mixture of a diorganotin oxide and a basic zinc carbonate. A more uniform particle size is very desirable, since it ensures that the composition will remain homogeneous during handling and shipping. If the average particle size of the two components are substantially different, the larger particles will tend to migrate toward the bottom of a container, and the composition will eventually become non-homogeneous. Should this occur, the activity of a particular catalyst sample would be dependent upon the location in the container from which the sample was obtained.

An additional advantage of the foregoing preferred method is that all of the particles are of substantially the same chemical composition. Even if one were to prepare a physical mixture of a diorganotin oxide and basic zinc carbonate and employ a jet mill or similar device to acheive a uniformly small particle size by mechanical means, basic zinc carbonate has a considerably higher density than a diorganotin oxide, and will tend to migrate to the lower levels of a container and eventually produce a non-homogeneous composition.

CURABLE POLYMER COMPOSITIONS

In addition to the amine-containing epoxide polymers described hereinbefore the present catalysts will increase the curing rate of numerous classes of polymer compositions containing hydroxyl and blocked isocyanate groups. Polymers that can be cured using blocked isocyanates include polyamides, acrylic polymers derived from acrylic and/or methacrylic acids and esters thereof with dihydric alcohols and polyesters derived from aromatic dicarboxylic acids, including the isomeric phthalic acids, and difunctional alcohols. Polyesters are particularly useful in the form of powder coatings that are applied as finely divided electrically charged particles onto a substrate, which is subsequently heated to fuse the discrete particles into a continuous coating.

The blocked isocyanate groups which are reacted with hydroxyl groups to form the cured polymer structure can be present as pendant groups on the film-forming polymer. Alternatively, a blocked polyfunctional isocyanate is deposited on a substrate together with the film-forming polymer during the coating operation. An example of a blocked polyfunctional isocyanate is a mixture of 2,4- and 2,6-tolylene diisocyanates that has been reacted with an alcohol such as 2-ethylhexanol using one mole of the alcohol for each mole of the diisocyanate.

The blocking agent for the isocyanate group is preferably an aromatic or aliphatic compound containing one hydroxyl group or other labile hydrogen source. Suitable blocking agents include phenols, alcohols containing 3 or more carbon atoms, ketoximes and lactams. The reaction of an isocyanate group with a blocking agent is usually reversible, particularly at elevated temperatures. Blocked isocyanates prepared using phenols decompose relatively rapidly at temperatures above about 150° C., and usually do not require any catalyst. The odor, toxicity, corrosion and pollution problems associated with phenols have limited their use as blocking agents in coating formulations. If it is desired to minimize the formation of volatile by-products during curing, the blocking agent selected should be a solid or relatively high-boiling liquid. One of the preferred classes of blocking agents are alcohols containing 6 or more carbon atoms. In addition to acting as a blocking agent, the free alcohol functions as a plasticizer for the coating. It has been found that the rate of decomposition or "unblocking" of blocked isocyanates prepared using these higher molecular weight alcohols is relatively slow within the desired curing temperature range of from 120° to 180° C. in the absence of a catalyst such as those of the present invention. The catalyst concentration required to achieve the desired rate of curing is from 0.01 to 1.0%, based on the weight of non-volatile materials present in the coating composition, preferably from 0.05 to 0.5%.

Cross-linkable coating compositions containing the catalyst compositions of this invention can be applied to metallic or non-metallic substrates using any of the conventional coating method, such as spraying, dipping and brushing. Metal substrates can be coated by electrodeposition as previously disclosed. Irrespective of the method of application, the coating is subsequently cured by heating the coated substrate at temperatures from about 100° to about 180° C. At these elevated temperatures the blocked isocyanate decomposes, liberating the free isocyanate which reacts with the hydroxyl groups present on the polymer to form a cross-linked structure. The desired level of solvent resistance can usually be achieved following from 15 to 30 minutes of heating.

A conventional method for comparing the relative activities of various catalyst compositions is by incorporating the catalysts into a coating material containing hydroxyl and blocked isocyanate groups. The coating material is applied to a steel panel and cured by heating the panel in an oven maintained at a specified temperature. A coated surface of the panel is then rubbed using a cloth which had previously been dipped in methyl isobutyl ketone or other solvent for the non-cross-linked polymer. The number of double rubs (back and forth strokes) required to remove or abrade the coating is recorded. Alternatively, more completely cured coatings are rated by observing the extent to which the coating is abraded following 20 to 50 double rubs.

The following examples disclose preferred embodiments of the present catalyst and polymer compositions, and should not be interpreted as limiting the scope of the invention defined in the accompanying claims.

EXAMPLE I

A pigmented coating formulation containing an amine-modified epoxide polymer having blocked isocyanate groups was applied to steel panels by cathodic electrocoating and subsequently cured.

A pigmented aqueous coating composition containing as the film-forming polymer an amine-modified epoxide polymer was prepared as described in U.S. Pat. No. 4,031,050 and combined with the catalyst to be evaluated. When the catalyst consisted of two compounds the catalyzed composition was prepared by either (1) blending together appropriate amounts of two aqueous dispersions or solutions, each of which contained the film-forming polymer and one of the catalyst components, or (2) adding each of the catalyst components individually to the polymer composition.

The polymer contained both hydroxyl and blocked isocyanate groups and the composition contained 20% by weight of non-volatile materials. Films were deposited from this composition on phosphate-treated steel panels by cathodic electrocoating using a bath temperature of 27° C., and an immersion time of two minutes. The voltage employed was from 100 to 300 volts. The actual voltage used for each experiment was that value which yielded a film thickness of 0.0006 inch (0.0015 cm), measured after the coated panel had been heated at 177° C. for 30 minutes.

The coated panels were cured by heating them for 30 minutes in a circulating air oven maintained at from 163° to 177° C. and evaluated as previously described by rubbing the surface of the coated panel with a cloth that had been previously saturated with methyl isobutyl ketone. The rating system employed summarized in the following table.

| | APPEARANCE OF COATING | |
|---|---|---|
| Rating | Cure Temperature = 163° C. | Cure Temperature = 177° C. |
| 1 | Minimum of 50 double rubs required to expose metal surface | No noticeable effect on coating after 20 double rubs, only slight burnishing after 50 double rubs |
| 2 | From 25 to 45 double rubs required to expose metal surface | Slight abrasion after 20 double rubs; moderate abrasion after 50 double rubs |
| 3 | From 15 to 25 double rubs required to expose metal | Moderate abrasion after 20 double rubs, severe abrasion after 50 double rubs |
| 4 | — | From 10 to 15 double rubs required to expose metal |
| 5 | — | Metal surface exposed |

-continued

| CATALYST | CONCEN-TRATION[a] | RATING |
|---|---|---|
| Bu$_2$SnO[b] (control) | 0.1 | 1 |
| Bu$_2$Sn(AcAc)$_2$[c] (control) | 0.1 | 1 |
| Cu(AcAc)$_2$ (control) | 0.1 | 2 |
| Zn(AcAc)$_2$ (control) | 0.1 | 2 |
| Ni(AcAc)$_2$ (control) | 0.1 | 2 |
| Fe(AcAc)$_2$ (control) | 0.1 | 2 |
| Bu$_2$SnO (control) | 0.050 | 2 |
| Bu$_2$SnO (control) | 0.025 | 3 |
| Bu$_2$Sn(AcAc)$_2$/Zn carbonate (basic) | 0.05/0.05 | 1 |
| Zn carbonate (basic) (control) | 0.1 | 2 |
| Bu$_2$Sn(AcAc)$_2$/Zn(AcAc)$_2$ | 0.05/0.05 | 1 |
| Zn(OOCCH$_3$)$_2$ (control) | 0.1 | 4 |
| Bu$_2$Sn(AcAc)$_2$/Zn(OOCCH$_3$)$_2$ | 0.05/0.05 | 1 |
| Bu$_2$Sn(AcAc)$_2$/Cu(AcAc)$_2$ | 0.05/0.05 | 1 |
| Bu$_2$Sn(AcAc)$_2$/Fe(AcAc)$_2$ | 0.05/0.05 | 1 |
| Bu$_2$SnO/Zn(AcAc)$_2$ | 0.05/0.05 | 1 |
| Bu$_2$SnO/Zn(AcAc)$_2$ | 0.0375/0.0625 | 1 |
| Bu$_2$SnO/Zn(AcAc)$_2$ | 0.0125/0.0875 | 1 |
| Bu$_2$SnO/Cu(AcAc)$_2$ | 0.05/0.05 | 1 |
| Bu$_2$SnO/Zn(AcAc)$_2$ | 0.025/0.075 | 1 |
| Bu$_2$SnO/Ni(AcAc)$_2$ | 0.05/0.05 | 1 |
| Bu$_2$SnO/Zn lactate | 0.05/0.05 | 1 |
| Bu$_2$SnO/Zn carbonate (basic) | 0.05/0.05 | 1 |
| Bu$_2$Sn(AcAc)$_2$/Cu(OOCCH$_3$)$_2$ | 0.05/0.05 | 1 |
| Cu(OOCCH$_3$)$_2$ (control) | 0.1 | 2 |
| MnCO$_3$ (control) | 0.1 | 4 |
| Bu$_2$SnO/MnCO$_3$ (control) | 0.05/0.05 | 4 |

NOTES:
[a]Concentration: moles based on weight of non-volatile ingredients (4.8 kg).
[b]Bu = n-C$_4$H$_9$—
[c]AcAc = acetylacetonate; acetylacetone = 2,4-pentanedione The data in the preceding table demonstrate that up to 90% of the tin compound can be replaced by the divalent metal compound without significantly reducing the rate or degree of curing achieved using the tin compound alone at a concentration of 0.1 moles. At levels below 0.05 moles of the tin compound the rating of the coating is still substantially higher than one would expect from a simple additive effect of the ratings obtained using either of the two components individually at the concentration level of that component in the mixture.

The improvement achieved using the bivalent metal compounds of this invention is evident from the rating of the coating prepared using the control catalyst containing 0.05 moles dibutyltin oxide (rating=2) and 0.05 moles manganese carbonate (rating=4). The coating obtained using the combination of these compounds exhibits a rating of 4. By comparison the coating obtained using a combination of 0.05 moles dibutyltin oxide (rating=2) and 0.05 moles of a divalent metal compound of this invention exhibits a rating of 1, which is higher than the rating obtained using dibutyltin oxide at a level of 0.05 moles or the salt at a level of 0.1 moles.

Dibutyltin bis(acetylacetonate) was prepared by reacting 1 mole of dibutyltin oxide with 2 moles of 2,4-pentanedione (acetylacetone). The reaction was conducted using 1 liter of toluene as the diluent and the water generated as a by-product of the reaction was removed by azeotropic distillation and collected in a Dean-Stark trap. Heating of the reaction mixture was continued until 17.5 g. of water had been collected and no additional evolution of water was observed. The toluene was then removed by evaporation under reduced pressure and the resultant solid, which weighed 430.4 g., was employed without additional purification.

EXAMPLE II

This example discloses a preferred catalyst and a method for preparing it.

A glass reactor equipped with a reflux condenser, Dean-Stark trap, thermometer and an additional funnel was charged with 1500 g. of deionized water, 224.5 g. of sodium carbonate and 1.11 g. of a commercially available surfactant (Triton®X-100). The contents of the reactor were heated to about 90° C., at which time a solution containing 181.2 g. of dibutyltin dichloride, 175.2 g. of zinc chloride and 1 liter of methanol was gradually added to the reactor over a period of 1½ hours. The reaction mixture was maintained at the boiling point by external heating during the addition and for about 4 hours thereafter. The solid phase of the reaction mixture was isolated, washed with water until no chloride ion was detected in the water using silver nitrate and then dried in a vacuum oven at a temperature of 60° C.

A scanning electron photomicrograph of the product at a magnification of 1000X revealed particles having an appearance similar to that of basic zinc carbonate particles. By comparison, under the same conditions the particles obtained by blending together finely divided dibutyltin oxide and basic zinc carbonate using a propeller type mixer were clearly of two distinguishable types. One type resembled zinc carbonate and the second type was ovoidal and characteristic of dibutyltin oxide.

What is claimed is:

1. A composition for catalyzing the curing reaction between a blocked organic polyisocyanate and a polymer having hydroxyl groups capable of reacting with polyisocyanates said catalyst composition comprising:
   (1) a divalent metal compound selected from the group consisting of salts and chelated coordination complexes of copper$^{II}$, zinc$^{II}$, nickel$^{II}$, iron$^{II}$, cobalt$^{II}$ and vanadium$^{II}$ and
   (2) an amount of a tin-containing urethane catalyst sufficient to increase the catalytic effectiveness of said divalent metal compound wherein said tin-containing catalyst is present in an amount from about 10% by weight of the combined weight of said divalent metal compound and tin-containing urethane catalyst in said composition.

2. A composition according to claim 1 where the urethane catalyst comprises a stannous salt of a carboxylic acid, an organostannonic acid, an organothiostannonic acid, a diorganotin oxide or sulfide, a mono- or diorganotin halide or a mono- or diorganotin derivative of a β-diketone, carboxylic acid, mercaptocarboxylic acid or ester, mercaptoalcohol or ester, mercaptan or alcohol.

3. A composition according to claim 2 where the urethane catalyst comprises a dialkyltin oxide or -bis-β-diketonate.

4. A composition according to claim 3 wherein the urethane catalyst comprises dibutyltin oxide or dibutyltin bis-acetylacetonate.

5. A composition according to claim 1 where the metal compound is derived from an inorganic acid, a carboxylic acid, a hydroxycarboxylic acid, an alcohol, a glycol, a phenol or a β-diketone.

6. A composition according to claim 5 where the metal compound comprises a carboxylate containing from 1 to 20 carbon atoms, a hydroxycarboxylate containing from 2 to 20 carbon atoms, a β-diketonate containing from 5 to 20 carbon atoms or a basic carbonate.

7. A composition according to claim 6 where the β-diketonate comprises an acetylacetonate.

8. A composition according to claim 6 where the carboxylate comprises an acetate or a lactate.

9. A composition according to claim 1 wherein the metal compound comprises basic zinc carbonate, zinc lactate, zinc acetate, copper acetate or an acetylacetonate of zinc$^{II}$, copper$^{II}$, nickel$^{II}$ or iron$^{II}$.

10. A composition according to claim 1 wherein said tin-containing catalyst compound comprises from 25 to 50% of the combined weight of said catalyst composition.

11. A curable polymeric composition comprising
(a) a polymeric component containing pendant hydroxyl groups capable of reacting with polyisocyanates and an organic polyisocyanate component containing at least two blocked isocyanate groups or a polymeric component containing both pendant hydroxyl groups and blocked isocyanate groups, and
(b) a catalytically effective amount of a catalyst composition comprising a divalent metal compound selected from the group consisting of salts and chelated coordination complexes of copper$^{II}$, zinc$^{II}$, nickel$^{II}$, iron$^{II}$, cobalt$^{II}$, and vanadium$^{II}$ and a tin-containing urethane catalyst in an amount sufficient to increase the catalytic effectiveness of said divalent metal compound and wherein said tin-containing catalyst constitutes from about 10% by weight of the combined weight of divalent metal and tin-containing catalyst.

12. A composition according to claim 11 where the urethane catalyst comprises a stannous salt of a carboxylic acid, an organostannonic acid, an organothiostannonic acid, a diorganotin oxide or sulfide, a mono- or diorganotin halie or a mono- or diorganotin derivative of a β-diketone, carboxylic acid, mercaptocarboxylic acid or ester, mercaptoalcohol or ester, mercaptan or alcohol.

13. A composition according to claim 12 where the urethane catalyst comprises a dialkyltin oxide or bis -β-diketonate.

14. A composition according to claim 13 wherein the urethane catalyst comprises dibutyltin oxide or dibutyltin bis-acetylacetonate.

15. A composition according to claim 11 in which the non-metallic portion of the metal compound is derived from an inorganic acid, carboxylic acid, hydroxycarboxylic acid, alcohol, phenol or β-diketone.

16. A composition according to claim 15 where the non-metallic portion comprises carboxylate containing from 1 to 20 carbon atoms, hydroxycarboxylate containing from 2 to 20 carbon atoms, β-diketonate containing from 5 to 20 carbon atoms or basic carbonate.

17. A composition according to claim 16 where the β-diketonate comprises acetylacetonate.

18. A composition according to claim 16 where the carboxylate comprises acetate or lactate.

19. A composition according to claim 11 wherein the metal compound comprises basic zinc carbonate, zinc lactate, zinc acetate, copper acetate or the acetylacetonates of zinc$^{II}$, copper$^{II}$, nickel$^{II}$ or iron$^{II}$.

20. A composition according to claim 11 where the divalent metal compound comprises from 50 to 75% by weight of the combined weight of said catalyst composition.

21. A composition according to claim 11 where the combined weight of said catalyst is an amount of from 0.01 to 1.0% of the polymeric composition.

22. A composition according to claim 21 wherein the combined weight of said catalyst is an amount from 0.05 to 0.5% by weight of the polymeric composition.

23. In a method for catalyzing the curing reaction between polymers having hydroxyl groups capable of reacting with polyisocyanates and blocked organic polyisocyanates, the improvement which comprises employing a catalytically effective amount of a divalent metal compound selected from the group consisting of salts and chelated coordinated complexes of zinc$^{II}$, copper$^{II}$, nickel$^{II}$, iron$^{II}$, cobalt$^{II}$ and vanadium$^{II}$ and a tin-containing urethane catalyst wherein the amount of said tin-containing urethane catalyst is not catalytically effective by itself and the metal compound constitutes up to about 90% by weight of the combined weight of urethane catalyst and metal compound.

24. A method according to claim 23 where the non-metallic portion of the metal compound is derived from an inorganic acid, carboxylic acid, hydroxycarboxylic acid, alcohol, phenol or β-diketone.

25. A method according to claim 24 where the non-metallic portion comprises carboxylate containing from 1 to 20 carbon atoms, hydroxycarboxylate containing from 2 to 20 carbon atoms or β-diketonate containing from 5 to 20 carbon atoms.

26. A method according to claim 25 where the non-metallic portion comprises acetate, lactate, basic carbonate or acetylacetonate and the metal is zinc$^{II}$, copper$^{II}$, nickel$^{II}$ or iron$^{II}$.

27. A method according to claim 26 where the metal compound comprises basic zinc carbonate or a diacetylacetonate of zinc$^{II}$, copper$^{II}$, iron$^{II}$ or nickel$^{II}$.

28. A method according to claim 23 wherein the metal compound constitutes from 50 to 75% of the combined weight of urethane catalyst and metal compound.

29. A composition according to claim 1 wherein said divalent metal compound constitutes from about 50% to about 75% by weight of the combined weight of divalent metal and tin-containing catalyst.

30. A method of preparing the catalyst composition of claim 1 which comprises reacting a mixture of a mineral acid or carboxylic acid salt of a metal selected from the group consisting of copper$^{II}$, zinc$^{II}$, nickel$^{II}$, iron$^{II}$, cobalt$^{II}$ and vanadium$^{II}$, and a mineral acid or carboxylic acid salt of a diorganotin compound with at least a stoichiometric amount of an alkali metal carbonate or bicarbonate for the time necessary to form a carbonate or bicarbonate salt of substantially all the divalent metal and diorganotin compounds in said reaction mixture.

31. The method of claim 30 wherein a mixture of a divalent metal halide salt and a diorganotin dihalide salt is reacted with a stoichiometric excess of sodium carbonate or bicarbonate.

* * * * *